(12) United States Patent
George et al.

(10) Patent No.: US 11,548,648 B2
(45) Date of Patent: Jan. 10, 2023

(54) ROBUST POWER TRANSMISSION

(71) Applicant: GOODRICH CORPORATION, Charlotte, NC (US)

(72) Inventors: Adam George, Alliance, OH (US); Mark James Didyk, Mogadore, OH (US)

(73) Assignee: Goodrich Corporation, Charlotte, NC (US)

( * ) Notice: Subject to any disclaimer, the term of this patent is extended or adjusted under 35 U.S.C. 154(b) by 268 days.

(21) Appl. No.: 16/742,637

(22) Filed: Jan. 14, 2020

(65) Prior Publication Data

US 2021/0214090 A1 Jul. 15, 2021

(51) Int. Cl.
*B64D 15/12* (2006.01)
*H05B 3/26* (2006.01)
*H05B 6/10* (2006.01)

(52) U.S. Cl.
CPC .............. *B64D 15/12* (2013.01); *H05B 3/26* (2013.01); *H05B 6/101* (2013.01)

(58) Field of Classification Search
CPC ................................ B64D 15/12; B64D 15/14
See application file for complete search history.

(56) References Cited

U.S. PATENT DOCUMENTS

| | | | | |
|---|---|---|---|---|
| 2,942,330 A * | 6/1960 | Luke | ...................... | B64D 15/12 219/528 |
| 3,420,476 A * | 1/1969 | Schultz | .................. | B64D 15/12 244/134 D |
| 5,344,696 A * | 9/1994 | Hastings | ................. | B64D 15/12 442/379 |
| 5,351,918 A * | 10/1994 | Giamati | .................. | B64D 15/12 244/134 R |
| 5,925,275 A * | 7/1999 | Lawson | ................. | B64D 15/12 219/543 |
| 5,971,323 A * | 10/1999 | Rauch | .................... | B64D 15/12 219/202 |
| 7,157,663 B1 * | 1/2007 | Kismarton | ............... | H05B 3/28 219/548 |
| 7,763,833 B2 | 7/2010 | Hindel et al. | | |
| 8,662,452 B2 * | 3/2014 | Hallander | .............. | B64D 15/12 219/202 |
| 10,155,593 B2 | 12/2018 | Burton et al. | | |

(Continued)

FOREIGN PATENT DOCUMENTS

EP 0459216 12/1991
EP 1204551 7/2006

(Continued)

OTHER PUBLICATIONS

European Patent Office, European Search Report dated May 14, 2021 in Application No. 21151181.1.

*Primary Examiner* — Richard R. Green
*Assistant Examiner* — Arfan Y. Sinaki
(74) *Attorney, Agent, or Firm* — Snell & Wilmer L.L.P.

(57) ABSTRACT

A heating element and conductive element system may include a heater conductive element and a heating element. The heater conductive element and the heating element may be integral components. The heater conductive element and the heating element may be discrete components. The heater conductive element may be configured for enhanced mechanical fatigue compared to typical conductive element.

16 Claims, 6 Drawing Sheets

(56) References Cited

U.S. PATENT DOCUMENTS

| | | | |
|---|---|---|---|
| 2007/0075188 A1* | 4/2007 | Stoner | F01D 25/02 244/134 D |
| 2007/0092371 A1* | 4/2007 | Oldroyd | H05B 3/347 415/177 |
| 2010/0155538 A1* | 6/2010 | Calder | B64D 15/12 156/182 |
| 2013/0043342 A1* | 2/2013 | Nordin | H05B 3/145 244/1 A |
| 2014/0224782 A1* | 8/2014 | Nordman | B32B 15/18 219/202 |
| 2015/0114945 A1* | 4/2015 | Miller | B64C 27/463 219/202 |
| 2015/0136752 A1* | 5/2015 | Gerome | B64D 33/02 219/202 |
| 2015/0314880 A1* | 11/2015 | Vercellesi | H05K 1/0298 219/539 |
| 2018/0070411 A1 | 3/2018 | Wei | |
| 2018/0346133 A1* | 12/2018 | Paulson | H05B 3/0004 |
| 2019/0098702 A1 | 3/2019 | Dardona et al. | |
| 2019/0193862 A1* | 6/2019 | Kinlen | B32B 3/266 |
| 2019/0322375 A1* | 10/2019 | Hardman | B32B 27/288 |

FOREIGN PATENT DOCUMENTS

| | | |
|---|---|---|
| EP | 2868575 | 5/2015 |
| WO | 0110713 | 2/2001 |
| WO | 2006130454 | 12/2006 |

\* cited by examiner

Detail D

ROBUST POWER TRANSMISSION

FIELD

The present disclosure relates to robust electrical power transmission, and more particularly, robust electrical power transmission for ice protection heating elements on a aircraft surface.

BACKGROUND

An Aircraft is equipped with wings, propeller blades, and or rotor blades which generate lift, vertical and horizontal, and enable the aircraft to fly. Ice accretion may occur on a leading edge of these surfaces due to cold temperatures at high altitudes. A leading edge may be heated by utilizing thermoelectric heaters along a leading edge. Thermoelectric heaters may utilize bus bars or wires with soldered connections for conductive circuits to the thermoelectric heaters.

SUMMARY

A heating and conductive element apparatus is disclosed herein. The heating and conductive apparatus may comprise: a heating element; and a conductive element coupled to the heating element, the conductive element configured to conduct electricity to the heating element, wherein the conductive element and the heating element are a monolithic component.

The heating element may comprise a material and the conductive element comprises the material. The conductive element may be configured for conduction, and wherein the heating element is configured for resistance. The conductive element may comprise a chain link structure. The conductive element may comprise a plurality of traces extending from a first side to a second side. The conductive element may comprise a plurality of diagonal traces and a plurality of orthogonal traces extending from a first side to a second side, and wherein the plurality of diagonal traces are configured to intersect the plurality of orthogonal traces. The conductive element may be etched into a chain link structure.

An ice protection system is disclosed herein. The ice protection system may comprise: a blade having a leading edge, the blade extending from an inboard side to an outboard side; a first heating element disposed proximate the inboard side along the leading edge; a second heating element disposed adjacent to the first heating element, the second heating element disposed distal to the inboard side; a second heater feed conductive element extending from the inboard side to the second heating element; and a second heater return conductive element extending from the inboard side to the second heating element.

In various embodiments, the second heater feed conductive element and the second heater return conductive element may comprise a chain link structure. The second heater feed conductive element and the second heater return conductive element may be disposed adjacent to the first heating element. The second heating element may be a carbon nanotube heating element. The second heating element, the second heater feed conductive element, and the second heater return conductive element may be a monolithic component. The ice protection system may further comprise a third heating element, a third heater feed conductive element, and a third heater return conductive element, wherein the third heating element is disposed adjacent to the second heating element and distal to the inboard side of the blade, and wherein the third heater feed conductive element and the third heater return conductive element extend from the inboard side to the third heating element. The ice protection system may further comprise a first laminate layer, a second laminate layer, and a third laminate layer, the first heating element disposed between the first laminate layer and the second laminate layer along a first portion of the blade extending from the inboard side to the second heating element, wherein the second heater feed conductive element and the second heater return conductive element are disposed between the second laminate layer and the third laminate layer along the first portion of the blade. The ice protection system may further comprise a fourth laminate layer. The third heater feed conductive element and the third heater return conductive element may be disposed between the third laminate layer and the fourth laminate layer along the first portion of the blade.

An aircraft is disclosed herein. The aircraft may comprise: a blade having a leading edge, the blade extending from an inboard side to an outboard side; a first heating element disposed proximate the inboard side along the leading edge; a second heating element disposed adjacent to the first heating element, the second heating element disposed distal to the inboard side; and a second heater conductive element extending from the inboard side to the second heating element.

In various embodiments, the second heater conductive element and the second heating element may be a monolithic component. The second heating element may be configured for resistance. The second heater conductive element may be configured for conduction of electricity. The second heating element may be a carbon nanotube heating element. The second heater conductive element may be coupled to the second heating element. The aircraft may further comprise insulation, wherein the second heater conductive element is disposed adjacent to the first heating element, and wherein the insulation is disposed between the second heater conductive element and the first heating element.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to tacked, attached, fixed, coupled, connected or the like may include permanent, removable, temporary, partial, full and/or any other possible attachment option. Additionally, any reference to without contact (or similar phrases) may also include reduced contact or minimal contact.

Figure 1:
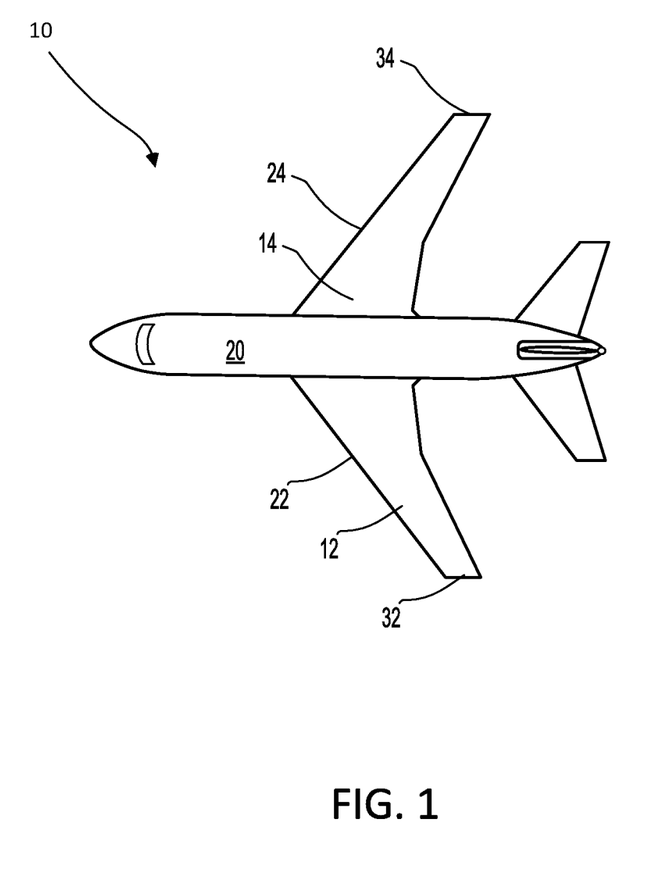
FIG. 1 illustrates a plain view showing an aircraft, in accordance with various embodiments.

With reference to FIG. 1, an aircraft 10 is provided with a left side wing 12 and a right side wing 14 designed to provide lift to the aircraft and enable it to fly. Each wing 12, 14 may have a leading edge 22, 24 extending from the fuselage 20 to a wing tip 32, 34. The leading edge 22, 24 may direct the flow of air around each wing 12, 14 during operation. The flow traveling under the wing may provide pressure in the vertical direction of the wing and generate lift for the aircraft. During operation, leading edges 22, 24 may experience ice accretion at high altitudes due to cold temperatures. Aircraft leading edges 22, 24 may be structurally supported by various ribs spaced across the span of the leading edge 22, 24. In various embodiments, leading edges 22, 24 may be heated by a thermoelectric element extending along the span of the leading edge 22, 24. In various embodiments, wiring may extend along the span and provide electrical connections to a thermoelectric element and/or electrical components needing power along the wing 12, 14, such as wing tip lights. The wiring may be supported by the plurality of structural ribs providing support to the leading edges 22, 24.

Figure 2A:
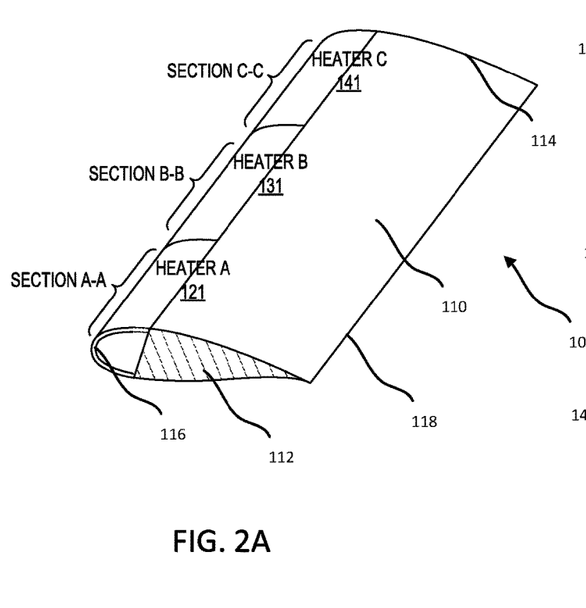
FIG. 2A illustrates an ice protection system for a blade of an aircraft, in accordance with various embodiments.

Referring now to FIG. 2A, an ice protection system 100 for a blade of an aircraft is illustrated, in accordance with various embodiments. The ice protection system 100 may include a blade 110 extending from an inboard end 112 to an outboard end 114 (e.g., a tip, or the like). The blade 110 includes a leading edge 116 and a trailing edge 118. The ice protection system may further comprise a first heating element 121 (e.g., heater A) and a second heating element 131 (e.g., heater B). The first heating element 121 may be disposed proximate leading edge 116 internal to blade 110 proximate the inboard end 112. The second heating element 131 may be disposed internal to blade 110 and adjacent to the first heating element 121 distal to inboard end 112.

In various embodiments, ice protection system 100 may further comprise a third heating element 141 (e.g., heater C). The third heating element 141 may be disposed proximate outboard end 114 and/or distal to inboard end 112. In various embodiments, the second heating element 131 may be disposed between first heating element 121 and third heating element 141. The first heating element 121, the second heating element 131, and the third heating element 141 may be configured for spanwise shedding of ice disposed on leading edge 116 of blade 110. First heating element 121, second heating element 131, and third heating element 141 may be configured to heat leading edge 116 independent of each other. In various embodiments, first heating element 121 and second heating element 131 may be active while third heating element 141 is inactive. In various embodiments, any number of heating elements may be active or inactive at a given time based on energy available to the ice protection system 100 or the like.

In various embodiments, each heating element (e.g., first heating element 121, second heating element 131, and/or third heating element 141) may be any electrothermal heater known in the art. For example, each heating element may comprise a wire wound element, a tapered watt density with foil technology element, such as that sold under the trademark HotProp®, which is available from Goodrich® Corporation, a electrothermal heater element, such as that sold under the trademark Duratherm®, which is available from Goodrich® Corporation, carbon nanotube (CNT) elements, or the like. Each heating element may be coupled to the blade 110 by any method known in the art, such as an adhesive, a fastener, or the like.

Figure 2B:
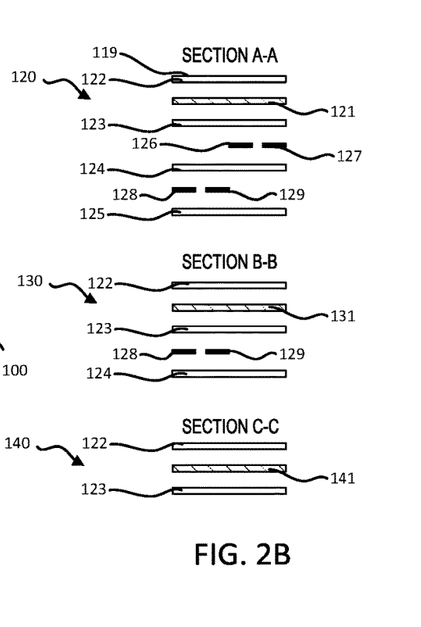
FIG. 2B illustrates various cross-sections of the blade from FIG. 2A, in accordance with various embodiments.

Referring now to FIG. 2B, cross sections of leading edge 116 at each heater assembly location from FIG. 2A is illustrated, in accordance with various embodiments. Referring to Section A-A of a first portion 120 of blade 110 may comprise first heating element 121, a first laminate layer 122, a second laminate layer 123, a third laminate layer 124, a second heater feed conductive element 126, and a second heater return conductive element 127. The first heating element 121 may be disposed between the first laminate layer 122 and the second laminate layer 123. The second heater feed conductive element 126 and the second heater return conductive element 127 may be disposed between the second laminate layer 123 and the third laminate layer 124. As illustrated, the first heating element 121 is separated from the exterior surface 119 by one laminate layer 122. However, those skilled in the art will recognize that the first heating element 121 may be separated from the exterior surface 119 by any suitable number of laminate layers 122. Similarly, second heater feed conductive element 126 and second heater return conductive element 127 may be disposed between any suitable number of laminate layers. In various embodiments, with combined reference to FIGS. 2A and 2B, second heater feed conductive element 126 and second heater return conductive element 127 may extend from inboard end 112 to a connection point of second heating element 131.

In various embodiments, first portion 120 of blade 110 may further comprise a fourth laminate layer 125, a third heater feed conductive element 128, and a third heater return conductive element 129. The third heater feed conductive element 128 and the third heater return conductive element 129 may be disposed between the third laminate layer 124 and the fourth laminate layer 125. Each feed conductive element and each return conductive element may be configured for robust power transmission. "Robust power transmission" as defined herein refers to greater fatigue resistance compared to typical power transmission. Each feed conductive element may comprise a plurality of parallel paths with reduced electrical resistance. Each feed conductive element and each return conductive element may reduce connections at a respective heating element and/or allow for a thinner heating element. In various embodiments, each laminate may be a composite laminate, or the like.

Referring to Section B-B of a second portion 130 of blade 110 may comprise second heating element 131, first laminate layer 122 and second laminate layer 123. The second heating element 131 may be disposed between the first laminate layer 122 and the second laminate layer 123. In various embodiments, the second heater feed conductive element 126 and the second heater return conductive element 127 may be integral to second heating element 131. For example, second heater feed conductive element 126 and second heater return conductive element 127 may be etched as a continuous foil as second heating element 131. In various embodiments, "integral," as referred to herein may refer to a monolithic component. A monolithic component is a single component manufactured from a single piece of material. In various embodiments, an integral heating assembly including a feed conductive element, a return conductive element, and a heating element may eliminate a soldering connection, which may enhance fatigue resistance of the assembly and/or allow for robust power transmission. In various embodiments, the second heating element 131, the second heater feed conductive element 126, and the second heater return conductive element 127 may all comprise the same material. The second heating element 131 may be configured to be a resistive path and/or provide heat. The second heater feed conductive element 126 and the second heater return conductive element 127 may be configured for a conductive path and/or to provide little or no heat.

In various embodiments, the second heater feed conductive element 126 and the second heater return conductive element 127 may be discrete elements from the second heating element 131. For example, second heating element 131 may comprise a carbon nanotube heating element. When a carbon nanotube heating element is utilized, the second heater feed conductive element 126 and/or the second heater return conductive element 127 may comprise copper, silver, or any other conductive material known in the art. In various embodiments, the carbon nanotube heater may be coupled to the second heater feed conductive element 126 and the second heater return conductive element by any method known in the art, such as soldering or the like.

In various embodiments, second portion 130 of blade 110 may further comprise third laminate layer 124, third heater feed conductive element 128, and third heater return conductive element 129. The third heater feed conductive element 128 and the third heater return conductive element 129 may be disposed between the second laminate layer 123 and the third laminate layer 124. In various embodiments, with combined reference to FIGS. 2A and 2B, third heater feed conductive element 128 and third heater return conductive element 129 may extend from inboard end 112 to a connection point of third heating element 141.

Referring to Section C-C of a third portion 140 of blade 110 may comprise third heating element 141, first laminate layer 122 and second laminate layer 123. The third heating element 141 may be disposed between the first laminate layer 122 and the second laminate layer 123. In various embodiments, the third heater feed conductive element 128 and the third heater return conductive element 129 may be integral to third heating element 141. For example, third heater feed conductive element 128 and third heater return conductive element 129 may be etched as a continuous foil as third heating element 141. In various embodiments, the third heater feed conductive element 128 and the third heater return conductive element 129 may be discrete elements from the third heating element 141.

Figure 3:
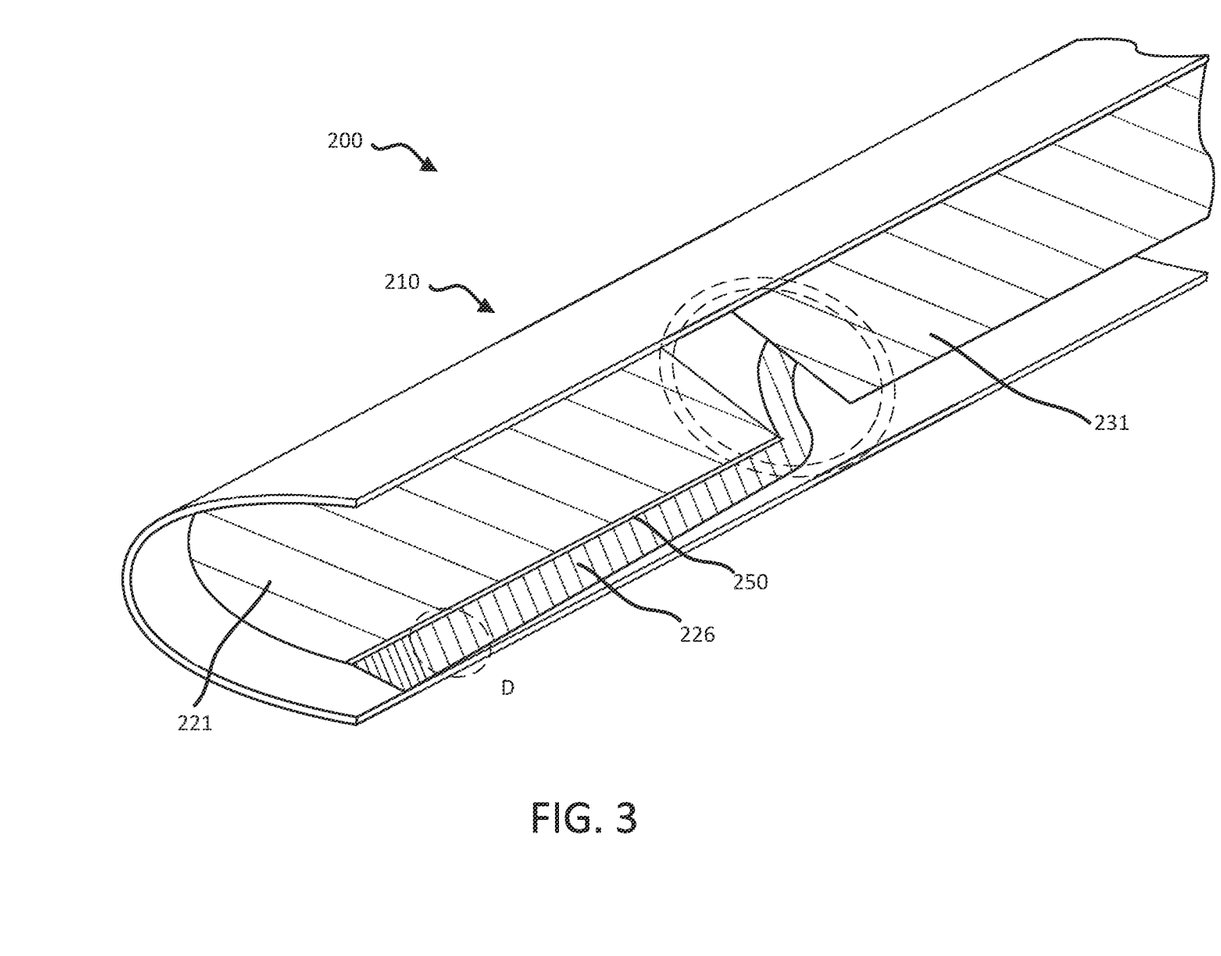
FIG. 3 illustrates an ice protection system for a blade of an aircraft, in accordance with various embodiments.

Referring now to FIG. 3, a portion of an ice protection system 200, in accordance with various embodiments, is illustrated. The ice protection system 200 includes a blade 210, a first heating element 221 and a second heating element 231. A portion of first heating element 221 is removed for clarity. In various embodiments, blade 210 may be in accordance with blade 110, first heating element 221 may be in accordance with first heating element 121 and/or second heating element 231 may be in accordance with second heating element 131. The ice protection system further comprises a second heater conductive element 226. Second heater conductive element 226 may be in accordance with second heater feed conductive element 126 or second heater return conductive element 127. Although only a single conductive element (i.e., second heater conductive element 226) is illustrated in FIG. 3, it would be apparent to one skilled in the art that a feed conductive element and a return conductive element could be coupled to second heating element 231 in accordance with FIG. 3.

In various embodiments, second heater conductive element 226 may be disposed adjacent to first heating element 221. In various embodiments, insulation 250 may be disposed between first heating element 221 and second heater conductive element 226. Insulation 250 may be configured to electrically isolate first heating element 221 from second heater conductive element 226. In various embodiments, second heater conductive element 226 may be integral to second heating element 231.

Figure 4:
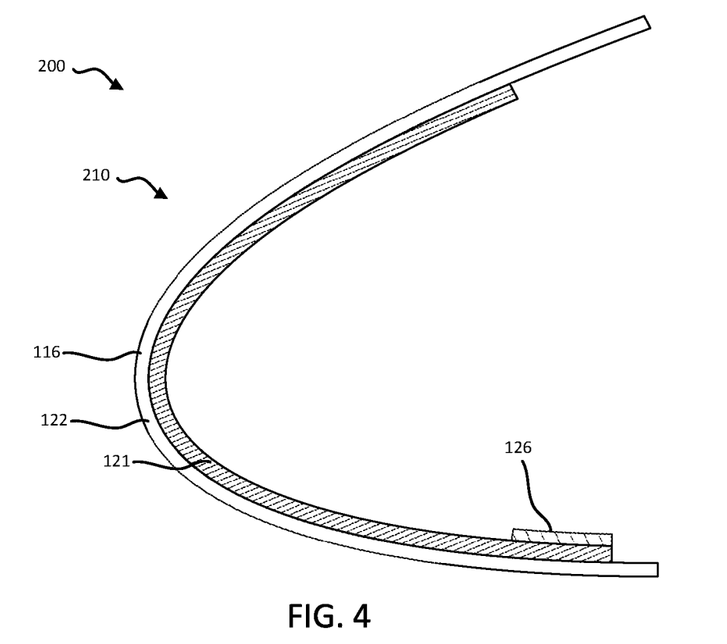
FIG. 4 illustrates a cross-sectional view of a leading edge of a blade for an aircraft, in accordance with various embodiments.

Referring now to FIG. 4, a cross section of a portion of ice protection system 100 in accordance with various embodiments is illustrated. Second laminate layer 123, third laminate layer 124, fourth laminate layer 125, second heater return conductive element 127, third heater feed conductive element 128, and third heater return power feed transmission are removed for sake of clarity and illustrative purposes. The second heater feed conductive element 126 may be disposed radially inward of the first heating element 121. The second heater feed conductive element 126 may be disposed anywhere radially inward of first heating element 121 along leading edge 116 of blade 110. With combined reference to FIGS. 3 and 4, although illustrated as radially inward of first heating element 121 or adjacent to first heating element 221, any combination of ice protection system 100 and ice protection system 200 is within the scope of this disclosure.

Figure 5:
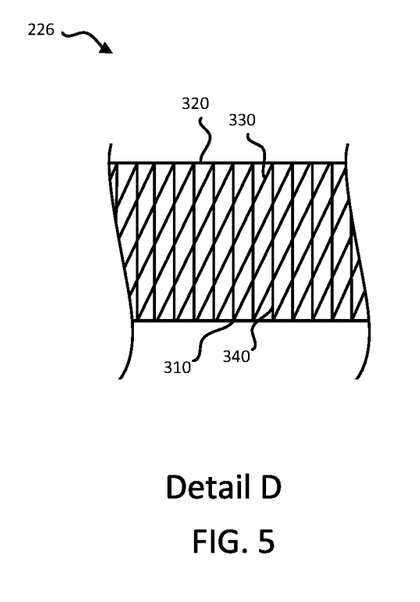
FIG. 5 illustrates a conductive element of an ice protection system, in accordance with various embodiments.

Referring now to FIG. 5, detail D illustrating a portion of second heater conductive element 226, is shown in accordance with various embodiments. Second heater conductive element 226 may comprise a chain-link structure, a mesh structure, or the like. Second heater conductive element 226 may comprise a plurality of parallel paths extending from a first side 310 to a second side 320. The second heater conductive element 226 may comprise a plurality of diagonal traces 330 extending from first side 310 to second side 320. Similarly, the second heater conductive element 226 may comprise a plurality orthogonal traces 340 extending of substantially perpendicular from first side 310 to second side 320. In various embodiments, the plurality of orthogonal traces 340 and the plurality of diagonal traces 330 may be etched from a conductive ribbon element, or the like. The plurality of diagonal traces 330 and the plurality of orthogonal traces 340 may ensure multiple redundant paths. If a trace in the plurality of diagonal traces 330 or the plurality of orthogonal traces 340 break, the current may only go a short distance until it reconnects to an adjacent trace.

In various embodiments, second heater conductive element 226 may comprise a conductive material, such as copper, silver, nickel, or the like. The second heater conductive element 226 may be configured to provide little or no heat. In various embodiments, second heater feed conductive element 126, second heater return conductive element 127, third heater feed conductive element 128, and/or third heater return conductive element 129 may be in accordance with second heater conductive element 226 and vice versa.

Figure 6:
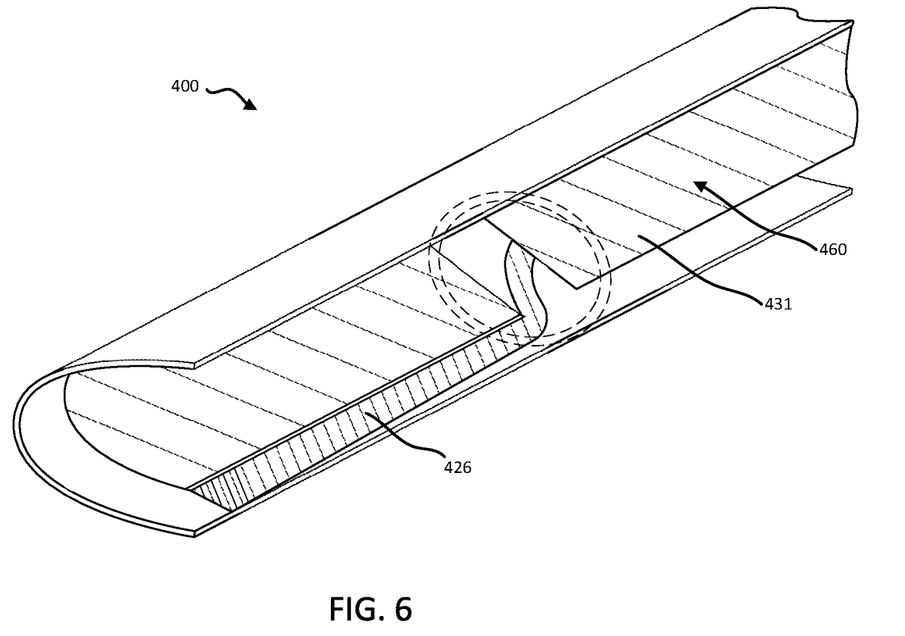
FIG. 6 illustrates an ice protection system for a blade of an aircraft, in accordance with various embodiments.

Referring now to FIG. 6, an ice protection system 400, in accordance with various embodiments, is illustrated. In various embodiments, the ice protection system 400 may comprise a heating and conductive element apparatus 460. The heating and conductive element apparatus 460 may comprise a heating element 431 and a heater conductive element 426. Heating element 431 and second heater conductive element 426 may comprise the same material. Heating element 431 may be configured to be a resistive path and/or provide heat. The conductive element 426 may be configured for a conductive path and/or to provide little or no heat. The heater conductive element 426 may be in accordance with second heater conductive element 226, second heater feed conductive element 126, second heater return conductive element 127, third heater feed conductive element 128, and/or third heater return conductive element 129 and vice versa.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An ice protection system, comprising:
   a blade having a leading edge, the blade extending from an inboard side to an outboard side;
   a first heating element disposed proximate the inboard side along the leading edge;
   a second heating element disposed adjacent to the first heating element, the second heating element disposed distal to the inboard side;
   a first heater feed conductive element extending from the inboard side to the second heating element; and
   a first heater return conductive element extending from the inboard side to the second heating element, wherein the first heater feed conductive element and the first heater return conductive element each comprise a plurality of diagonal traces and a plurality of orthogonal traces extending from a first side to a second side, the plurality of diagonal traces configured to intersect the plurality of orthogonal traces, each orthogonal trace in the plurality of orthogonal traces being orthogonal relative to the first side and the second side.

2. The ice protection system of claim 1, wherein the first heater feed conductive element and the first heater return conductive element are disposed adjacent to the first heating element.

3. The ice protection system of claim 1, wherein the second heating element is a carbon nanotube heating element.

4. The ice protection system of claim 1, wherein the second heating element, the first heater feed conductive element, and the first heater return conductive element are a monolithic component.

5. The ice protection system of claim 1, further comprising a third heating element, a second heater feed conductive element, and a second heater return conductive element, wherein the third heating element is disposed adjacent to the second heating element and distal to the inboard side of the blade, and wherein the second heater feed conductive element and the second heater return conductive element extend from the inboard side to the third heating element.

6. The ice protection system of claim 5, further comprising a first laminate layer, a second laminate layer, and a third laminate layer, the first heating element disposed between the first laminate layer and the second laminate layer along a first portion of the blade extending from the inboard side to the second heating element, wherein the first heater feed conductive element and the first heater return conductive element are disposed between the second laminate layer and the third laminate layer along the first portion of the blade.

7. The ice protection system of claim 6, further comprising a fourth laminate layer, wherein the second heater feed conductive element and the second heater return conductive element are disposed between the third laminate layer and the fourth laminate layer along the first portion of the blade.

8. The ice protection system of claim 1, wherein each diagonal trace in the plurality of diagonal traces intersects a set of orthogonal traces in the plurality of orthogonal traces.

9. The ice protection system of claim 8, wherein each orthogonal trace in the plurality of orthogonal traces is spaced apart in a longitudinal direction from an adjacent orthogonal trace in the plurality of orthogonal traces.

10. An aircraft, comprising:
a blade having a leading edge, the blade extending from an inboard side to an outboard side;
a first heating element disposed proximate the inboard side along the leading edge;
a second heating element disposed adjacent to the first heating element, the second heating element disposed distal to the inboard side; and
a heater conductive element extending from the inboard side to the second heating element, wherein the heater conductive element comprises a plurality of diagonal traces and a plurality of orthogonal traces extending from a first side to a second side, the plurality of diagonal traces configured to intersect the plurality of orthogonal traces, each orthogonal trace in the plurality of orthogonal traces being orthogonal relative to the first side and the second side.

11. The aircraft of claim 10, wherein the heater conductive element and the second heating element are a monolithic component.

12. The aircraft of claim 11, wherein the second heating element is configured for resistance, and wherein the heater conductive element is configured for conduction of electricity.

13. The aircraft of claim 10, wherein the second heating element is a carbon nanotube heating element, and wherein the heater conductive element is coupled to the second heating element.

14. The aircraft of claim 10, further comprising insulation, wherein the heater conductive element is disposed adjacent to the first heating element, and wherein the insulation is disposed between the heater conductive element and the first heating element.

15. The aircraft of claim 10, wherein each diagonal trace in the plurality of diagonal traces intersects a set of orthogonal traces in the plurality of orthogonal traces.

16. The aircraft of claim 15, wherein each orthogonal trace in the plurality of orthogonal traces is spaced apart in a longitudinal direction from an adjacent orthogonal trace in the plurality of orthogonal traces.

* * * * *